United States Patent
Griesbeck

(10) Patent No.: US 11,618,443 B2
(45) Date of Patent: Apr. 4, 2023

(54) CLOUD-BASED DETECTION AND WARNING OF DANGER SPOTS

(71) Applicant: Continental Automotive GmbH, Hannover (DE)

(72) Inventor: Martin Griesbeck, Parkstetten (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 198 days.

(21) Appl. No.: 16/738,630

(22) Filed: Jan. 9, 2020

(65) Prior Publication Data

US 2020/0391735 A1  Dec. 17, 2020

(30) Foreign Application Priority Data

Jan. 14, 2019  (DE) .................... 10 2019 200 345.1

(51) Int. Cl.
*B60W 30/095* (2012.01)
*B60W 40/08* (2012.01)
(Continued)

(52) U.S. Cl.
CPC ........ *B60W 30/0956* (2013.01); *B60W 40/08* (2013.01); *B60W 50/14* (2013.01);
(Continued)

(58) Field of Classification Search
CPC ............. B60W 30/0956; B60W 40/08; B60W 50/14; B60W 2540/043; B60W 2555/20;
(Continued)

(56) References Cited

U.S. PATENT DOCUMENTS

| 2007/0040705 A1* | 2/2007 | Yoshioka | G08G 1/0969 340/988 |
| 2007/0222565 A1* | 9/2007 | Kawamata | G06V 20/58 348/148 |

(Continued)

FOREIGN PATENT DOCUMENTS

| CN | 104978860 A | * 10/2015 | |
| DE | 10 2008 012 660 A1 | 12/2008 | ........... G08G 1/0967 |

(Continued)

OTHER PUBLICATIONS

Machine translation of CN104978860A (published Oct. 14, 2015) obtained from Espacenet Sep. 14, 2022 (Year: 2022).*

(Continued)

*Primary Examiner* — Peter D Nolan
*Assistant Examiner* — Tanya C Sienko
(74) *Attorney, Agent, or Firm* — Slayden Grubert Beard PLLC

(57) ABSTRACT

A backend for a hazard detection system comprising: a processor; and a memory in communication with the processor, the memory storing a set of instructions. The set of instructions, when accessed and executed by the processor, cause the processor to: receive vehicle and/or driver data from a vehicle, evaluate the received vehicle and/or driver data, use the evaluation as a basis for detecting a hazard in road traffic, and send the information about the detected hazard to at least one vehicle to warn said vehicle about the hazard.

9 Claims, 2 Drawing Sheets

(51) Int. Cl.
  *B60W 50/14* (2020.01)
  *G08G 1/0967* (2006.01)
  *H04L 67/10* (2022.01)

(52) U.S. Cl.
  CPC ............... *G08G 1/096708* (2013.01); *B60W 2050/146* (2013.01); *B60W 2510/182* (2013.01); *B60W 2510/20* (2013.01); *B60W 2510/30* (2013.01); *B60W 2520/00* (2013.01); *B60W 2540/043* (2020.02); *B60W 2555/20* (2020.02); *H04L 67/10* (2013.01)

(58) Field of Classification Search
  CPC ..... B60W 2050/146; B60W 2510/182; B60W 2510/20; B60W 2510/30; B60W 2520/00; G08G 1/096708
  See application file for complete search history.

(56) References Cited

U.S. PATENT DOCUMENTS

| | | | | |
|---|---|---|---|---|
| 2010/0164752 A1* | 7/2010 | Stahlin | ............. | G08G 1/096716 340/905 |
| 2011/0125401 A1* | 5/2011 | Stahlin | ................... | G01C 21/26 701/532 |
| 2013/0113618 A1* | 5/2013 | Flanagan | ................. | E01F 9/559 340/539.1 |
| 2013/0151058 A1* | 6/2013 | Zagorski | .............. | G05D 1/0289 701/1 |
| 2013/0338914 A1* | 12/2013 | Weiss | ................... | G08G 1/0129 340/905 |
| 2016/0363935 A1* | 12/2016 | Shuster | ................ | G08G 1/0141 |
| 2017/0154241 A1* | 6/2017 | Shambik | .............. | G06V 40/103 |
| 2017/0182985 A1* | 6/2017 | Dai | .................. | G08G 1/096775 |
| 2017/0222612 A1* | 8/2017 | Zollner | .................... | H04R 3/12 |
| 2018/0032891 A1* | 2/2018 | Ba | ........................ | B60W 30/095 |
| 2018/0178770 A1* | 6/2018 | Dai | .................. | G08G 1/096716 |
| 2018/0222424 A1* | 8/2018 | Kodama | .................. | G08G 1/166 |
| 2018/0236986 A1* | 8/2018 | Kim | ...................... | G01S 13/345 |
| 2018/0286246 A1* | 10/2018 | Baca | ...................... | G08G 1/162 |
| 2019/0147260 A1* | 5/2019 | May | ...................... | G06V 20/584 382/103 |
| 2019/0217871 A1* | 7/2019 | Krishnan | .............. | B60W 40/06 |
| 2019/0294966 A1* | 9/2019 | Khan | .................... | G01S 15/931 |
| 2020/0035000 A1* | 1/2020 | Raut | ..................... | G06T 11/203 |
| 2020/0166941 A1* | 5/2020 | Yu | ........................ | G08G 1/0112 |
| 2020/0175863 A1* | 6/2020 | Sakurada | ................ | G06V 20/58 |
| 2020/0269872 A1* | 8/2020 | Cho | .................. | G08G 1/096741 |
| 2020/0279478 A1* | 9/2020 | Zhang | .................. | G08G 1/0129 |
| 2021/0056323 A1* | 2/2021 | Pfeiffer | .................... | B60T 7/12 |
| 2022/0009492 A1* | 1/2022 | Adwan | ................. | B60W 40/04 |

FOREIGN PATENT DOCUMENTS

| | | | | |
|---|---|---|---|---|
| DE | 10 2008 012 661 A1 | 2/2009 | .......... | G08G 1/0968 |
| DE | 102010012402 A1 * | 12/2010 | ....... | G08G 1/096716 |
| DE | 10 2013 021 835 A1 | 6/2015 | ............ | B60W 30/08 |
| DE | 102013021835 A1 * | 6/2015 | ............... | G08G 1/16 |

OTHER PUBLICATIONS

German Office Action, Application No. 10 2019 200 345.1, 7 pages, dated Nov. 25, 2019.

* cited by examiner

CLOUD-BASED DETECTION AND WARNING OF DANGER SPOTS

CROSS-REFERENCE TO RELATED APPLICATIONS

This application claims priority to German Patent Application No. DE 10 2019 200 345.1, filed on Jan. 14, 2019 with the German Patent and Trademark Office. The contents of the aforesaid application are incorporated herein for all purposes.

TECHNICAL FIELD

The present disclosure relates to vehicles. Various embodiments may include backends for a hazard detection system, vehicles for a hazard detection system, controllers for a vehicle, hazard detection systems, methods for detecting hazards in road traffic, program elements, and/or computer-readable media.

BACKGROUND

Vehicles are increasingly equipped with driver assistance systems that assist the driver in executing driving maneuvers. Further, vehicles may be equipped with highly or fully automatic driving functions. However, most vehicles today continue to be controlled or driven by a driver. Many events can arise in road traffic and be potential hazards, such as for example wild animals or black ice. Drivers are for the most part informed about these hazards only inadequately and this is moreover effected via many different channels, which means that there is a need for improvement in this area.

SUMMARY

The teachings of the present disclosure may better supply a driver with information. As an example, some embodiments include a backend (2) for a hazard detection system, wherein the backend (2) is configured to receive vehicle and/or driver data from a vehicle, wherein the backend (2) is configured to evaluate the received vehicle and/or driver data and to take this evaluation as a basis for detecting a hazard (31) in road traffic, wherein the backend is further configured to send the information about the detected hazard (31) to at least one vehicle (4) in order to warn said vehicle about the hazard (31).

In some embodiments, the backend (2) is configured to determine for each detected hazard (31) a probability value for the existence and currentness thereof, wherein the backend (2) is configured to send the information about the detected hazard (31) to at least one vehicle (4) only if the determined probability value exceeds a predefined limit value.

In some embodiments, the backend (2) is configured to receive vehicle and/or driver data from a multiplicity of vehicles (4), wherein the probability value for the existence and the currentness of the detected hazard (31) is based on the commonness of the hazard (31) detected in the received vehicle and/or driver data.

In some embodiments, the vehicle and/or driver data comprise a driving profile, a steering angle, a velocity, a braking pressure, ABS data, ESP data, an airbag activation and/or a hazard warning light activation.

In some embodiments, the backend (2) is configured to include further boundary conditions in the detection of the hazard, wherein the boundary conditions comprise the exterior temperature, the season, the time of day, the weather or the visibility.

As another example, some embodiments include a vehicle (4) for a hazard detection system having a vehicle and/or driver data capture apparatus (1), wherein the vehicle and/or driver data capture apparatus (1) comprises: a sensor apparatus (13); a transmitting/receiving unit (12); and a display unit (11), wherein the sensor apparatus (13) is configured to capture vehicle and/or driver data from the vehicle (4), wherein the transmitting/receiving unit (12) is configured to send the vehicle and/or driver data to the backend (2) and to receive information about a detected hazard (31) from the backend (2), and wherein the display unit (11) is configured to display the hazard sent from the backend (2) to a driver of the vehicle (4).

In some embodiments, the vehicle and/or driver data capture apparatus (1) further comprises an evaluation unit (10), wherein the evaluation unit (10) is configured to create a driving profile for a driver of the vehicle (4), wherein the evaluation unit (10) is further configured to compare the captured vehicle and/or driver data with the created driving profile and to send these vehicle and/or driver data to the backend (2) only if a difference arises.

As another example, some embodiments include a controller for a vehicle (4), configured to compare the captured vehicle and/or driver data with the created driving profile and to instruct the transmitting/receiving unit (12) to send these vehicle and/or driver data to the backend (2) only if a difference arises.

As another example, some embodiments include a hazard detection system for detecting hazards in road traffic, comprising: a backend (2) as described above; and a vehicle (4) having a vehicle and/or driver data capture apparatus (1) as described above.

As another example, some embodiments include a method for detecting hazards in road traffic, comprising the following steps: capturing (S1) vehicle and/or driver data by means of a vehicle and/or driver data capture apparatus of a vehicle; sending (S2) the captured vehicle and/or driver data from a transmitting/receiving unit to a backend; receiving (S3) the sent vehicle and/or driver data by means of the backend; evaluating (S4) the sent vehicle and/or driver data; detecting (S5) hazards on the basis of the evaluation; and sending (S6), by means of the backend, information about the detected hazard to at least one vehicle in order to warn said vehicle about the hazard.

As another example, some embodiments include a program element that, when executed on a backend (2), instructs the backend (2) to perform the method steps for the backend as described above.

As another example, some embodiments include a computer-readable medium on which the program element as described above is stored.

BRIEF DESCRIPTION OF THE DRAWINGS

The figures are schematic and not to scale. If the same reference signs are specified in the description of the figures that follows, they denote identical or similar elements.

DETAILED DESCRIPTION

Figure 1:
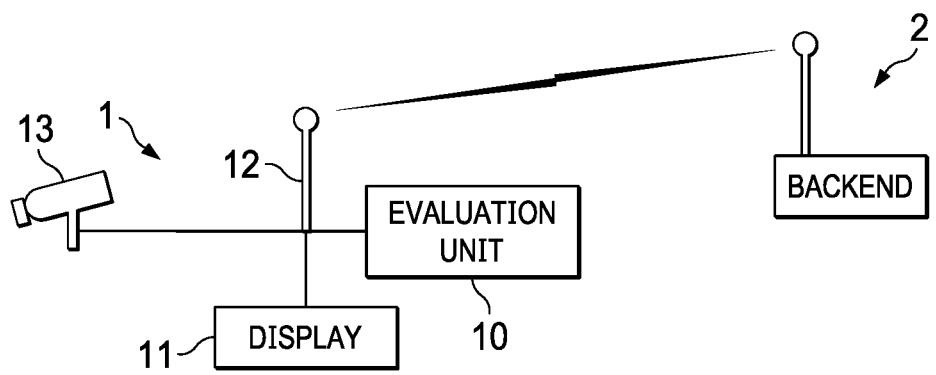
FIG. 1 shows a block diagram of a hazard detection system incorporating teachings of the present disclosure.

Some embodiments of the present disclosure include a backend for a hazard detection system. The backend is configured to receive vehicle and/or driver data from a vehicle. Further, the backend is configured to evaluate or analyze the received vehicle and/or driver data and to take this evaluation or this analysis as a basis for detecting a hazard in road traffic. In addition, the backend is configured to send or transfer the information about the detected hazard to at least one vehicle in order to warn said vehicle about the hazard.

In other words, the backend can detect hazards on the basis of vehicle and/or driver data and subsequently send the information about the detected hazards to vehicles selectively in order to warn said vehicles about this hazard. A central and automatic collection and distribution point for hazards can therefore be created that informs drivers and vehicles about current hazards promptly and reliably. The driver therefore does not receive hazard reports via a multiplicity of different channels, and for his part does not need to manually report hazards, e.g. to broadcasters. Information about hazards can therefore be provided to a driver or a vehicle easily, quickly, reliably and from a single source.

It should be noted that a hazard in road traffic in the spirit of this disclosure can be wild animals, black ice, fog, heavy snow, heavy rain, a fallen tree, an oil slick, wet leaves, a queue, an accident, roadworks, articles on the road, playing children or the like.

The automatic transferring, evaluating and distributing of the information about the hazard in road traffic means that it is no longer necessary for the driver to actively report hazards (e.g.: "I have seen a wild animal between X and Y"; or else: "children are playing very close to the edge of the road"; or "a large fragment is on the road"). Further, the multiplicity of connected vehicles means that automatic hazard evaluation can take place with a high level of reliability. E.g. if 100 vehicles sharply reduce their velocity at a specific spot, then there is a high likelihood of there being a "special situation" at that spot, e.g. a queue, an accident or roadworks. In addition, the standardized connection means that hazard information always comes to the driver or to the vehicle via the same "channel". The driver can therefore be relieved of load as he can rely on being informed about when there is a hazard on his route or in his surroundings.

In some embodiments, the backend can send the information about the hazard only to vehicles that are in direct proximity to the hazard or whose routes lead via the site of the hazard. To this end, the vehicle and/or driver data capture apparatus can also send, transmit or transfer the current position of the vehicle in addition to the vehicle and/or driver data. The position can be determined via GPS, for example.

In some embodiments, the backend is configured to determine for each detected hazard a probability value for the existence and/or currentness thereof. The backend is configured to send the information about the detected hazard to at least one vehicle only if the determined probability value exceeds a predefined limit value. The hazard can therefore be plausibilized by the backend, which means that only in the event of an actually existent hazard, which has a higher likelihood, is the information about this hazard distributed to other vehicles. By way of example, the limit value can be 70%, 80% or 90%, and only if this has been exceeded is the information about the hazard sent as a warning to other vehicles.

In some embodiments, the backend is configured to receive vehicle and/or driver data from a multiplicity of vehicles. The probability value for the existence and the currentness of the detected hazard is based on the relative commonness of the hazard detected in the received vehicle and/or driver data. In other words, the more vehicle and/or driver data the hazard has been detected in by the backend within a certain period, the higher the probability value for the existence and the currentness of the hazard can be.

In some embodiments, the vehicle and/or driver data comprise a driving profile, a steering angle, a velocity, a braking pressure, ABS data, ESP data, an airbag activation and/or a hazard warning light activation. Therefore, exclusively vehicle and/or driver data and no surroundings data, such as e.g. camera images, are used for the detection of the hazard by the backend.

In some embodiments, the backend is configured to include further boundary conditions in the detection of the hazard, wherein the boundary conditions comprise the exterior temperature, the season, the time of day, the weather or the visibility. The backend can therefore determine the hazard more accurately, since the boundary conditions mean that some hazards are more likely and other hazards can be ruled out. By way of example, black ice can be ruled out at temperatures above 4° C., but wet leaves appear very likely as a hazard in autumn.

In some embodiments, there is a vehicle for a hazard detection system having a vehicle and/or driver data capture apparatus. The vehicle and/or driver data capture apparatus comprises a sensor apparatus, a transmitting/receiving unit and a display unit. The sensor apparatus is configured to capture vehicle and/or driver data from the vehicle. The transmitting/receiving unit is configured to send or transfer the vehicle and/or driver data to the backend and to receive information about a detected hazard from the backend. The display unit is configured to display the hazard sent from the backend to a driver of the vehicle.

The sensor unit can comprise various sensors, such as for example a steering angle sensor, a braking pressure sensor, an ESP sensor, an ABS sensor, a velocity sensor, a yaw rate sensor, a light sensor or an airbag sensor. The sensor unit can therefore capture vehicle and/or driver data.

The transmitting/receiving unit can transfer the data to the backend wirelessly, over the air. The data can be wirelessly transferred and/or wirelessly received by Bluetooth, WLAN (e.g. WLAN 802.11a/b/g/n/ac or WLAN 802.11p), ZigBee or WiMax or else by means of cellular radio systems such as GPRS, UMTS, LTE or 5G. It is also possible to use other transfer protocols. The cited protocols provide the advantage of the standardization that has already taken place.

The transmitting/receiving unit can further receive information from the backend about the detected hazard, which means that the information about the hazard can be displayed to the driver of the vehicle via the display unit. The display unit in this instance can be a display or a monitor in the vehicle. By way of example, the information about the hazard can be displayed to the driver directly in the combination instrument.

In some embodiments, the vehicle is for example a motor vehicle, such as an automobile, a bus or a truck, or else a rail vehicle, a ship, an aircraft, such as a helicopter or an airplane, or for example a bicycle. In some embodiments, the vehicle or the vehicle and/or driver data capture apparatus can comprise a positioning unit in order to determine the position of the hazard. Within the context of the present disclosure, GPS for positioning the positioning unit is representative of all global navigation satellite systems (GNSSs), such as e.g. GPS, Galileo, GLONASS (Russia), Compass (China), IRNSS (India). In some embodiments, the position determination of the vehicle can also be effected by means of cell positioning. This is possible, in particular, when using GSM, UMTS or LTE networks.

In some embodiments, the vehicle and/or driver data capture apparatus further comprises an evaluation unit. The evaluation unit is configured to create a driving profile for a driver of the vehicle. Further, the evaluation unit is configured to compare the captured vehicle and/or driver data with the created driving profile and to send these vehicle and/or driver data to the backend only if a difference arises.

The evaluation unit can therefore create a driving profile and therefore determine the "normal" vehicle driving. The comparison with the current vehicle and/or driver data allows the evaluation unit to ascertain that there are differences from the "normal" vehicle driving (e.g.: warning lamps on; heavy braking activity; unusual steering movements for this road section, etc.). If the evaluation unit ascertains that there is a difference, the evaluation unit can instruct the transmitting/receiving unit to send or transfer the vehicle and/or driver data to the backend.

The backend in turn evaluates these vehicle and/or driver data and plausibilizes them. If the backend has a certain likelihood of coming to the conclusion that there is a hazard, the backend can send or transfer the information about the hazard to a vehicle (which is close to the hazard spot). In other words, the backend can then warn a driver of a vehicle or other road users about the hazard, or the backend informs the driver of the vehicle that there is a hazard at the spot on the road. The driver can then react accordingly at the site of the hazard.

In some embodiments, there is a controller for a vehicle. The controller is configured to compare the captured vehicle and/or driver data with the created driving profile and to instruct the transmitting/receiving unit to send these vehicle and/or driver data to the backend only if a difference arises.

In some embodiments, there is a hazard detection system for detecting hazards in road traffic. The hazard detection system comprises a backend described above and below and a vehicle described above and below.

Some embodiments include a method for detecting hazards in road traffic. The method comprises the following steps:
 capturing vehicle and/or driver data by means of a vehicle and/or driver data capture apparatus of a vehicle;
 sending the captured vehicle and/or driver data from a transmitting/receiving unit to a backend;
 receiving the sent vehicle and/or driver data by means of the backend;
 evaluating the sent vehicle and/or driver data;
 detecting hazards on the basis of the evaluation; and
 sending, by means of the backend, information about the detected hazard to at least one vehicle in order to warn said vehicle about the hazard.

It should be noted that the steps of the method can also be carried out in a different order or at the same time. Further, there may also be a longer period between individual steps. It should be noted that some steps can be carried out on the backend and some steps on the vehicle and/or driver data capture apparatus.

Some embodiments include a program element that, when executed on a backend, instructs the backend to perform the method described above and below.

Some embodiments include a computer-readable medium on which a program element is stored that, when executed on a backend, instructs the backend to perform the method described above and below.

Further features, advantages and possible applications of the teachings herein emerge from the description of the exemplary embodiments and the figures that follows.

FIG. 1 shows a block diagram of a hazard detection system. The hazard detection system comprises a vehicle and/or driver data capture apparatus 1 and a backend 2. The vehicle and/or driver data capture apparatus 1 for its part comprises an evaluation unit 10, a display unit 11, a transmitting/receiving unit 12 and a sensor apparatus 13.

The vehicle and/or driver data capture apparatus 1 may be installed in a vehicle, so that it can capture vehicle and/or driver data of the vehicle or of the driver of the vehicle. The vehicle and/or driver data capture apparatus 1 and the backend 2 can interchange data with one another, in particular vehicle and/or driver data and information about a hazard in road traffic. This can take place wirelessly via mobile radio networks, for example. The backend 2 can comprise a database in which hazards are stored in relation to locations.

The backend 2 can receive the vehicle and/or driver data of the vehicle or of the driver of the vehicle that are captured by the vehicle and/or driver data capture apparatus 1. To this end, the vehicle and/or driver data capture apparatus 1 can instruct the transmitting/receiving unit 12 to send or transfer the vehicle and/or driver data to the backend 2. The backend 2 can evaluate or analyze the received vehicle and/or driver data of the vehicle and detect hazards in road traffic therein. The information about the detected hazards can be stored by the backend 2 in the database.

Further, the backend 2 can send the information about the detected hazards to the vehicle and/or driver data capture apparatus 1 of the vehicle again in order to warn the vehicle or the driver of the vehicle about the hazard. This can take place in particular when the vehicle is close to the hazard, this being able to be ascertained by a positioning unit, for example. Further, the backend 2 can determine for each detected hazard a probability value for the existence and currentness thereof. In other words, a value indicating the likelihood of this hazard actually (in reality) existing and persisting. In this case, the backend 2 can reduce the probability value for the hazard if this hazard is not detectable by the backend 2 in the vehicle and/or driver data captured by the vehicle. In other words, the backend 2 can determine the probability value by using the relative commonness, that is to say in how many vehicle and/or driver data of different vehicles the hazard has been detected by the backend 2 within a certain time. Further, only if a predetermined limit value for the probability value (e.g. 60%, 70% or 80%) for the existence of a certain hazard is exceeded can information about the hazard be sent to at least one vehicle.

In some embodiments, the vehicle and/or driver data can be a driving profile, a steering angle, a velocity, a braking pressure, ABS data, ESP data, an airbag activation and/or a hazard warning light activation. The detection of the hazards is therefore based not on surroundings data, such as e.g. camera images or lidar sensors, but rather on vehicle and driver data.

The backend 2 can further take into consideration further parameters and boundary conditions in the detection of hazards in the vehicle and/or driver data captured by the vehicle, wherein the boundary conditions can be the exterior temperature, the season, the time of day, the weather or the visibility. The backend 2 can obtain these boundary conditions from a weather service, a calendar or a clock, for example. The backend 2 can therefore better and more accurately determine the hazard, e.g. whether there is black ice, a wild animal or a fallen tree. By way of example, black ice can be ruled out at a temperature of above 4° C., and wild animals are rather unlikely at midday in summer. However, the hazard as a result of wet leaves can certainly arise in autumn.

In some embodiments, the backend 2 can comprise a memory unit and a computing unit. Furthermore, the backend 2 may be distributed over multiple locations. The backend 2 may also be accessible via the Internet or another computer network, e.g. as a cloud. In addition, it should be noted that the backend can receive and evaluate vehicle and/or driver data from a multiplicity of different vehicles.

The transmitting/receiving unit 12 of the vehicle and/or driver data capture apparatus 1 can be used, in particular, to interchange the data. The sensor apparatus 13 may be configured to capture vehicle and/or driver data; in particular, the capture unit can capture vehicle and/or driver data of a vehicle or of a driver of a vehicle by means of various sensors. The sensor device 13 can capture for example a steering angle, a driving profile, a velocity, a braking pressure, ABS data, ESP data, an airbag activation and/or a hazard warning light activation and send or transfer it/them to the backend 2. In some embodiments, the evaluation unit 10 of the vehicle and/or driver data capture apparatus 1 can create a driving profile for the driver of the vehicle and compare the captured vehicle and/or driver data with the created driving profile. If the evaluation unit 10 ascertains that there is a difference in this instance, these vehicle and/or driver data can be sent to the backend 2 selectively. The display unit 11 can display the information about a hazard sent from the backend 2 so as to be visible and perceptible to a driver of the vehicle. The display unit 11 can be a monitor or a display in the vehicle, for example; further, it is also possible for already available monitors, such as for example the navigation screen or the combination instrument, to be used as display unit 11.

The transfer of the data by the transmitting/receiving unit 12 to the backend 2 can take place either continuously or periodically, that is to say at specific times, e.g. every minute.

Figure 2:
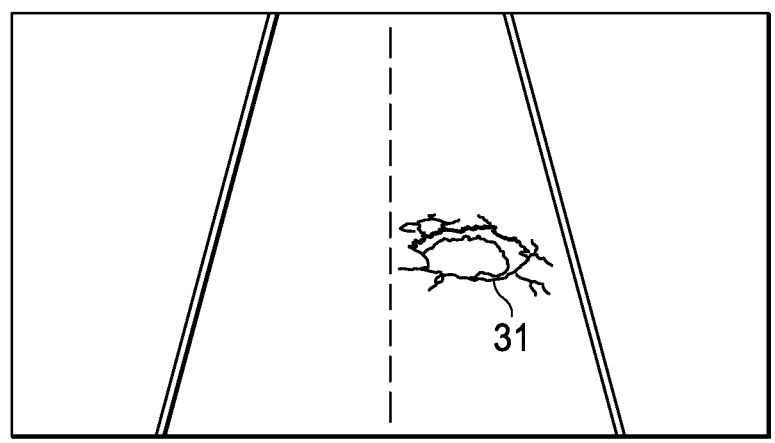
FIG. 2 shows a schematic depiction of a road with a hazard.

FIG. 2 shows a road with a hazard 31. In this case, the hazard 31 is an oil slick that is on the road. When the first vehicle passes the oil slick, either the driver of this vehicle may brake unusually sharply or, if the driver does not see the oil slick, the ABS or the ESP of the vehicle may be activated on driving over the oil slick. The vehicle and/or driver data therefore comprise a difference from the normal condition, and this allows the backend to detect a hazard. Further, the backend can rule out this being black ice if the exterior temperature is above 4° C.

Figure 3:
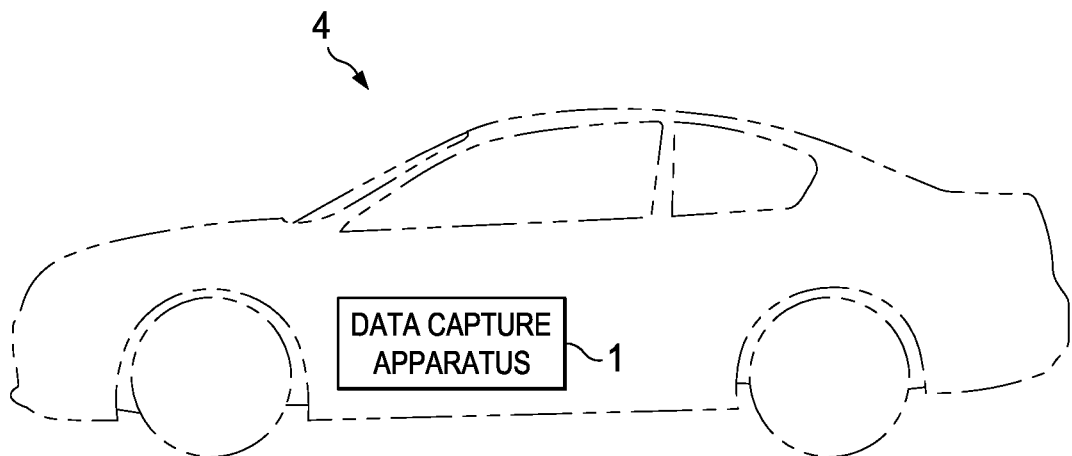
FIG. 3 shows a vehicle having a vehicle and/or driver data capture apparatus incorporating teachings of the present disclosure.

FIG. 3 shows a vehicle 4 having a vehicle and/or driver data capture apparatus 1. This vehicle and/or driver data capture apparatus 1 can capture vehicle and/or driver data of the vehicle 4 or of the driver of the vehicle 4. Further, the vehicle and/or driver data capture apparatus 1 can transfer the captured vehicle and/or driver data to the backend. In addition, a multiplicity of vehicles 4 having the described vehicle and/or driver data capture apparatus 1 can capture vehicle and/or driver data and transfer them to the backend. In addition, the vehicle 4 can receive information from the backend about hazards via the vehicle and/or driver data capture apparatus 1, so that the vehicle 4 or the driver of the vehicle 4 is warned about these hazards.

Figure 4:
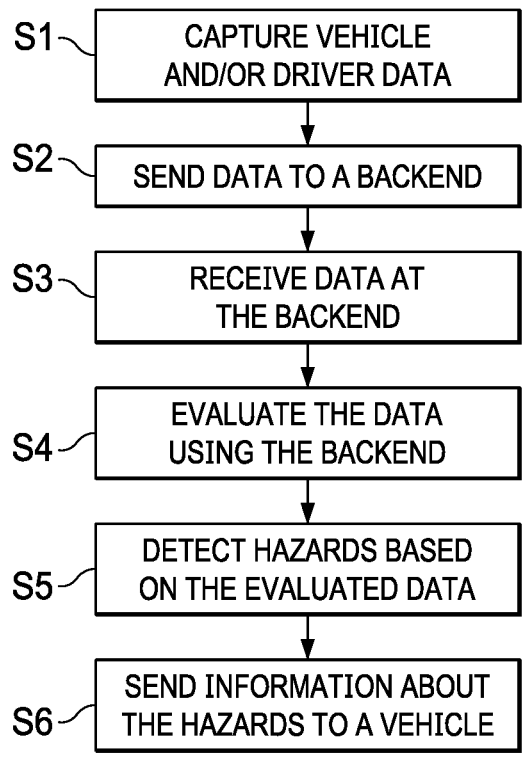
FIG. 4 shows a flowchart for a method for detecting hazards in road traffic incorporating teachings of the present disclosure.

FIG. 4 shows a flowchart for a method for detecting hazards in road traffic. In step S1, vehicle and/or driver data are captured by a vehicle and/or driver data capture apparatus of a vehicle. These captured vehicle and/or driver data are sent from a transmitting/receiving unit to a backend in step S2. In step S3, the sent vehicle and/or driver data are received by the backend. Next, the sent vehicle and/or driver data are evaluated by the backend in step S4. During this evaluation, the backend detects hazards in step S5. Next, the backend sends information about the detected hazard to at least one vehicle in step S6 in order to warn said vehicle about the hazard.

What is claimed is:

1. A backend for a hazard detection system, the backend comprising:
   a processor; and
   a memory in communication with the processor, the memory storing a set of instructions, wherein the set of instructions, when accessed and executed by the processor, cause the processor to:
      receive vehicle and/or driver data from a sensor associated with a first vehicle, evaluate the received vehicle and/or driver data,
      use the evaluation as a basis for detecting a hazard to road traffic, and
      send information about the detected hazard to the first vehicle or to a second vehicle to warn about the detected hazard;
   wherein the vehicle and/or driver data from the first vehicle include at least one datum selected from the group consisting of: a driving profile, a steering angle, a braking pressure, ABS data, ESP data, an airbag activation, and a hazard warning light activation and the data from the first vehicle does not include any surroundings data and/or camera images;
   wherein the detected hazard includes a hazard selected from the group consisting of: black ice, fog, heavy snow, heavy rain, an oil slick, and wet leaves; and
   wherein a display unit of the first vehicle or the second vehicle displays the information about the detected hazard sent from the backend to a driver.

2. The backend as claimed in claim 1, wherein the set of instructions further causes the processor to:
   determine for each detected hazard a probability value based on a likelihood for an existence and a currentness thereof; and
   send the information about the detected hazard only if the determined probability value exceeds a predefined limit value.

3. The backend as claimed in claim 2, wherein the set of instructions further causes the processor to receive vehicle and/or driver data from a multiplicity of vehicles; and
   wherein the probability value for the existence and the currentness of the detected hazard is based on the commonness of the hazard detected in the received vehicle and/or driver data.

4. The backend as claimed in claim 1,
   wherein the set of instructions further causes the processor to include further boundary conditions in the detection of the hazard;
   wherein the boundary conditions comprise at least one of: an exterior temperature, a season, a time of day, weather conditions, and a visibility measure.

5. A vehicle for a hazard detection system, the vehicle comprising:
   a sensor;
   a transmitting/receiving unit; and
   a display unit;
      wherein the sensor captures vehicle and/or driver data from the vehicle;
      the transmitting/receiving unit sends the vehicle and/or driver data to a backend and receives information about a detected hazard from the backend;
      the display unit displays the information about the detected hazard sent from the backend to a driver of the vehicle;
   wherein the vehicle and/or driver data from the first vehicle include at least one datum selected from the group consisting of: a driving profile, a steering angle, a braking pressure, ABS data, ESP data, an airbag activation, and a hazard warning light activation and the data from the first vehicle does not include any surroundings data and/or camera images;
   wherein the detected hazard includes a hazard selected from the group consisting of: black ice, fog, heavy snow, heavy rain, and wet leaves.

6. The vehicle as claimed in claim 5, further comprising an evaluation unit;
   wherein the evaluation unit creates a driving profile for the driver; and
   the evaluation unit compares the captured vehicle and/or driver data with the created driving profile and sends the vehicle and/or driver data to the backend only if a difference arises between the captured data and the created driving profile.

7. A hazard detection system for detecting hazards in road traffic, the system comprising:
   a processor; and
   a memory in communication with the processor, the memory storing a set of instructions;
   wherein the set of instructions, when accessed and executed by the processor, cause the processor to:
      receive vehicle and/or driver data from a vehicle,
      evaluate the received vehicle and/or driver data,
      use the evaluation as a basis for detecting a hazard in road traffic, and
      send the information about the detected hazard to the vehicle or to a second vehicle to warn about the hazard; and
   wherein the vehicle comprises:
      a sensor capturing vehicle data and/or driver data related to the first vehicle,
      a transmitting/receiving unit sending the vehicle data and/or the driver data to the processor and configured to receive data from the processor, and
      a display unit configured to display data received from the processor;
   wherein the vehicle and/or driver data from the first vehicle include at least one datum selected from the group consisting of: a driving profile, a steering angle, a braking pressure, ABS data, ESP data, an airbag activation, and a hazard warning light activation and the data from the first vehicle does not include any surroundings data and/or camera images;
   wherein the detected hazard includes a hazard selected from the group consisting of: black ice, fog, heavy snow, heavy rain, an oil slick, and wet leaves.

8. A method for alerting a driver of hazards in road traffic, the method comprising:
   capturing vehicle and/or driver data using a vehicle and/or driver data capture apparatus of a vehicle;
   sending the captured vehicle and/or driver data from a transmitting/receiving unit to a backend;
   receiving the sent vehicle and/or driver data at the backend;
   evaluating the sent vehicle and/or driver data using the backend;
   detecting hazards on the basis of the evaluation; and
   sending, using the backend, information about the detected hazard to the first vehicle or a second vehicle;
   wherein the vehicle and/or driver data from the first vehicle include at least one datum selected from the group consisting of: a driving profile, a steering angle, a braking pressure, ABS data, ESP data, an airbag activation, and a hazard warning light activation and the data from the first vehicle does not include any surroundings data and/or camera images; and
   displaying the information about the detected hazard sent from the backend to a driver using a display associated with the first vehicle or the second vehicle;
   wherein the detected hazard includes a hazard selected from the group consisting of: black ice, fog, heavy snow, heavy rain, an oil slick, and wet leaves.

9. A computer-readable non-transitory medium storing a set of instructions, the set of instructions, when executed by a processor, causing the processor to perform a method comprising:
   capturing vehicle and/or driver data using a data capture apparatus of a first vehicle;
   sending the captured vehicle and/or driver data from a transmitting/receiving unit to a backend;
   receiving the sent vehicle and/or driver data at the backend;
   evaluating the sent vehicle and/or driver data at the backend;
   detecting hazards on the basis of the evaluation; and
   sending information about the detected hazard to the first vehicle or to a second vehicle in order to warn about the hazard;
   wherein the vehicle and/or driver data from the first vehicle include at least one datum selected from the group consisting of: a driving profile, a steering angle, a braking pressure, ABS data, ESP data, an airbag activation, and a hazard warning light activation and the data from the first vehicle does not include any surroundings data and/or camera images; and
   displaying the information about the detected hazard sent from the backend to a driver using a display in the first vehicle or the second vehicle;
   wherein the detected hazard include a hazard selected from the group consisting of: black ice, fog, heavy snow, heavy rain, an oil slick, and wet leaves.

* * * * *